UNITED STATES PATENT OFFICE.

WILLIAM W. McLAURIN, OF MILLIKEN PARK, SCOTLAND, ASSIGNOR TO THE SMITH & McLAURIN, LIMITED, OF SAME PLACE.

SUBSTITUTE FOR LEATHER AND PROCESS OF PREPARING SAME.

SPECIFICATION forming part of Letters Patent No. 632,195, dated August 29, 1899.

Application filed October 31, 1898. Serial No. 695,100. (No specimens.)

*To all whom it may concern:*

Be it known that I, WILLIAM WALLACE MC-LAURIN, a subject of the Queen of Great Britain and Ireland, and a resident of Milliken Park, county of Renfrew, Scotland, have invented a certain new and useful Substitute for Leather and Process of Preparing Same, of which the following is a specification.

This invention has reference to and comprises a new or improved substitute for leather and process of preparing same, said material being capable of use in place of leather, leatherette, cloth, paper, or any similar material in the boot, shoe, upholstery, and fancy-leather trades; also, for bookbinding, box-making, and other useful purposes where these or similar materials are or can be utilized, and is the nearest approach to real leather yet produced.

The material utilized as the foundation for preparing this substitute for leather is that called and known in the trade as "vellum-cloth" or any similar material of a fibrous or felty nature in which the fibers are firmly bound together and have india-rubber or other suitable binding material intermixed or incorporated therewith for the purpose of imparting to the material a strength, pliability, and particularly an elasticity, without which neither cloth, paper, nor any other material would give the requisite results. The vellum-cloth or other suitable material is first coated in any convenient manner with a color stain in solution, to which lactarene or casein is added, mixed with either glycerin or any substance which will render the material pliable. This step of the process may, however, be dispensed with. The object of applying the stain is to so penetrate the vellum-cloth with it as to give the fibers a similar color to that of the finished article, thereby preventing the natural color of the fiber showing through if the surface of the finished material is scratched or broken. After drying a coating, preferably of glycerin, but it may be of other equivalent material, or a deliquescent salt in solution, is given to the stained material, either back or front, (back, preferably,) to render it more pliable. The material is next coated on one side in any convenient manner with one or more coats of color and a sizing material, such as gelatin in solution, a small quantity of glycerin or deliquescent salt being added, if required, to maintain the pliability. Instead of gelatin other sizing material may be used—such as glues, lactarenes, casein, "gloy" or vegetable paste, or any suitable animal or vegetable substance of a sizing nature. The material is then coated with casein or lactarene to give it the necessary surface-finish; but other suitable substances may be used, such as casein, gelatin, glue, or the like. If lactarene is used, the preferable proportion is solution of nine pounds lactarene to six gallons of water; but if more finish is required the quantity of lactarene is increased, and vice versa, and I prefer to use two coats of this solution. If desired to be rendered further waterproof, the material is coated with coating which will render the sizing and coating substance insoluble in water, such as formaldehyde (formalin) in solution. Instead of formaldehyde, however, chrome alum, alum, bichrome, or other similar agent may be employed. I prefer to use formalin in the proportion of one part to six parts of water.

If it is desired to impart a more highly-finished surface to the material, a further coating of sizing material—such as a solution of gelatin, lactarene, or casein—is given to it, after which it may be hot or cold calendered, friction-calendered, flinted, or finished in any manner suitable to impart the necessary luster and shade. It can also, if desired, afterward be embossed in any desired design by the usual method and appliances therefor.

In order to render the material untearable, two or more plies are pasted or secured together, preferably by india-rubber solution, in such a way that the main directions of the fibers of each lie across one another at different angles.

All the coating operations can be carried on by means at present in use, as also the drying operations, which take place after each new coating is applied.

Having now described my invention, what I claim as new, and desire to secure by Letters Patent, is—

1. A new article of manufacture consisting of vellum-cloth coated with glycerin, gelatin, casein, in the order named, and a waterproofing substance and having all the characteristics of leather, such as strength, pliability and resistance to moisture, substantially as described.

2. The herein-described process, consisting in coating vellum-cloth with glycerin, and then with gelatin, and then with casein, and then waterproofing the substance thus formed, substantially as described.

3. The herein-described process, consisting in coating vellum cloth with glycerin, then with gelatin mixed with coloring material and then with casein, and then waterproofing the substance thus formed, substantially as described.

4. The herein-described process, consisting in coating vellum-cloth with glycerin, and then with gelatin mixed with color, and then with casein, then waterproofing the substance thus formed, and then coating with sizing material and calendering, substantially as described.

In testimony whereof I have signed my name to this specification in the presence of two subscribing witnesses.

WM. W. McLAURIN.

Witnesses:
WM. RUTHERFORD,
R. C. THOMSON.